May 30, 1933.                P. C. PEREZ                 1,911,965
              NOVEL BUTTERING MACHINE, ATTACHABLE TO
                MEAT SLICING MACHINES AND THE LIKE
                      Filed July 10, 1930        2 Sheets-Sheet 1
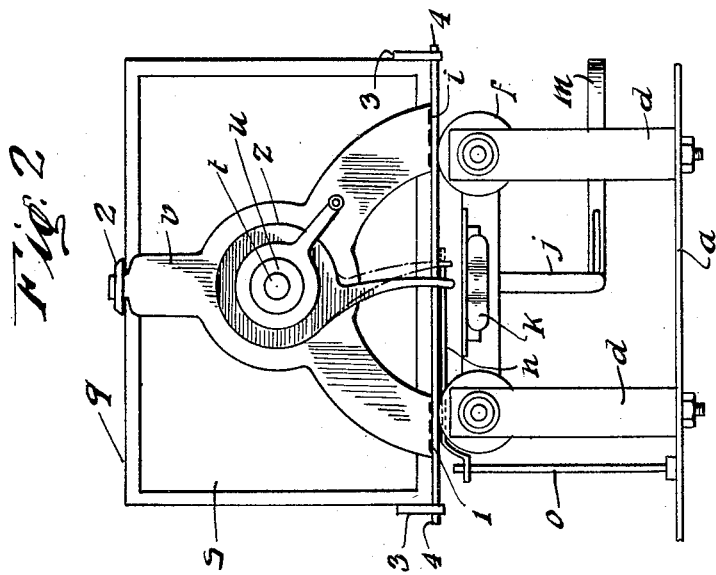
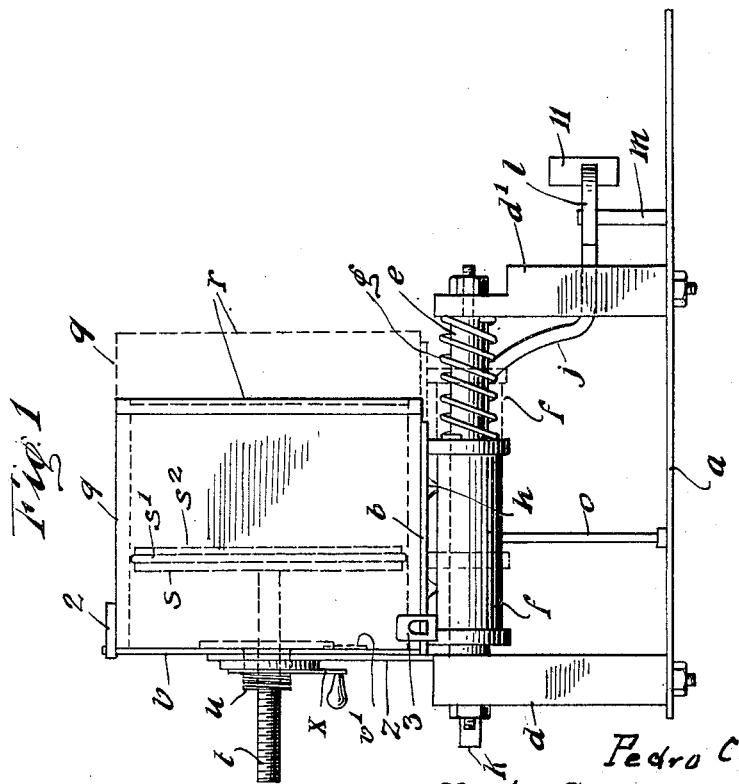
Inventor
Pedro Clerigo Perez
By his Attorney May 30, 1933.                    P. C. PEREZ                    1,911,965
              NOVEL BUTTERING MACHINE, ATTACHABLE TO
                MEAT SLICING MACHINES AND THE LIKE
                    Filed July 10, 1930          2 Sheets-Sheet 2
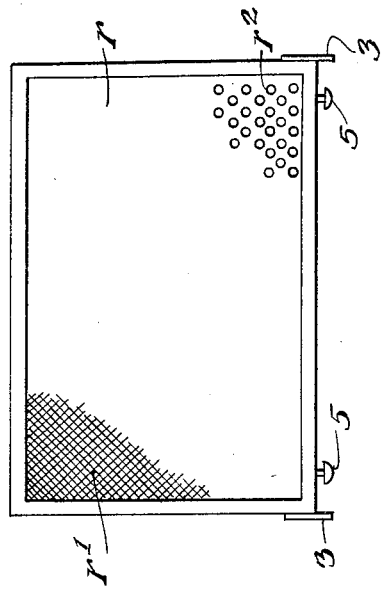
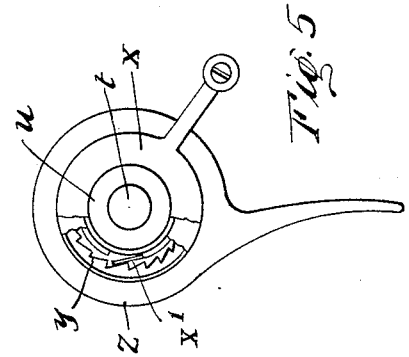
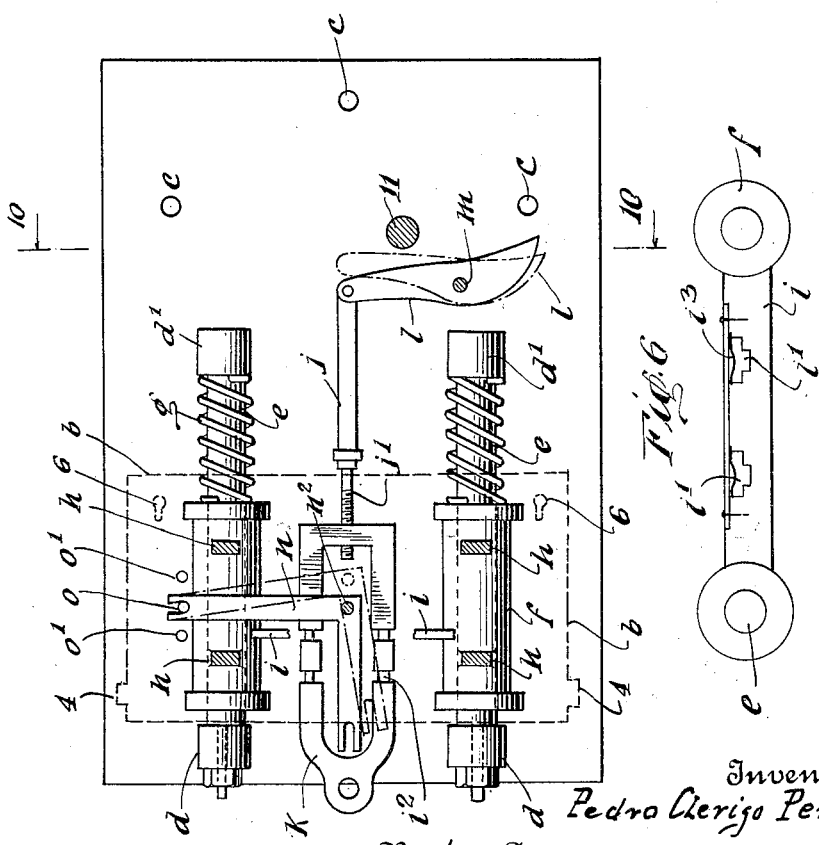
Inventor
Pedro Clerigo Perez
By his Attorney
George C. Henrick Patented May 30, 1933

1,911,965

UNITED STATES PATENT OFFICE

PEDRO CLERIGO PEREZ, OF BUENOS AIRES, ARGENTINA

NOVEL BUTTERING MACHINE, ATTACHABLE TO MEAT SLICING MACHINES AND THE LIKE

Application filed July 10, 1930, Serial No. 466,976, and in Argentina May 23, 1930.

The present invention refers to a novel buttering machine, attachable to meat slicing machines and the like, its employment representing great advantages, including high efficiency and output, as also exactitude in the buttering of sandwiches and the like, apart from the hygiene and cleanliness obtained with said machine.

The meat slicing machines of the carriage type, having a circular knife in vertical position, as well known; the carriage has an alternating movement by means of an eccentric lever which responds to the wheel turned by the person operating same.

The present machine is coupled to meat slicing machines of the type described, and is adapted for cutting the bread for sandwiches; said bread is automatically buttered before being cut, a slice of the desired thickness being obtained, with the quantity of butter according to the taste of the interested party.

In order that my invention may be clearly comprehensible, I have illustrated same with various figures, wherein:

Fig. 1 is a view of the right hand side of the machine;

Fig. 2 is a front view;

Fig. 3 is a plan view of the lower part for the better illustration of the various elements placed therein;

Fig. 4 is a view of the buttering front;

Fig. 5 is a front view of the ratchet wheel, and

Fig. 6 is a front view of a detail.

Construction

The construction comprises two principal parts; the organs or elements disposed on the fixed base A, and the elements placed on the movable base B.

The fixed base A is coupled or attached to a meat slicing machine by means of bolts and nuts, which are held in the perforations C (Fig. 3), the columns D and $D^1$ forming a solid body with this base A.

The columns $d$ and $d^1$ carry shafts $e$ firmly secured thereto (Figs. 1, 2 and 3). On shaft E the bushings F slide, which are maintained in position by the action of the pressure springs G. On the upper part of the bushings F there are on each two connecting members H which join the movable base B and make a solidary body with the bushings F.

The different parts disposed on this movable base B will be described further on.

The bushings $f$ are connected by a rack bar $i$ adapted to be engaged by the handle $k$ on the central shaft J, which carries the lever L, the fulcrum of which is indicated with the letter M.

The handle K is carrier of the central shaft J, the length of which is regulated by means of the threaded part $J^1$, which is screwed in one end of the handle K.

Between the upper part of the bushing F and the movable base B there is a space through which is placed one side of the right-angle lever $n$, the fulcrum $n^2$ of which is at the bottom of the base B. This lever $n$ ends at each extremity in a fork, one of which holds the fixed stem O, the latter being disposed in the base A, although it is possible to place same in various holes $O^1$ for the purpose of better graduation. (Figs. 2 and 3.)

At the other end the fork will hold the appendix of the pressure ratchet Z, which will be described further on.

Fig. 3 shows clearly what has already been described, above which is found the movable base B, shown in this figure in dotted lines.

Over this base is in turn disposed the buttering device which comprises a container of cubical form Q, having one of its sides R (Fig. 4) of perforated sheet $R^1$ or formed of netting $R^2$ or the like, adapted for the object in view. The opposite side will be open, and in same is placed the pressure plate or plunger S constituted by three sheets; the outer one S, the intermediate $S^1$, which is of caoutchouc, and the inner $S^2$, forming a sort of piston.

The plunger S has a rod $t$ extending through the front face of container $q$ and threaded at its outer end. A substantially triangularly shaped element $v$ partly closes the front of container $c$ and is held in place by means of a spring $v^1$, said element $v$ carries in its middle a bushing $u$ having a central hole provided with an inner thread for the passage of rod $t$ and an exterior thread as shown in Figure 1 on which is held a crank X provided with a stop $x^1$ engaging the teeth Y of a member Z on rod $t$, having a downwardly directed finger engaging between the prongs of the forked end of the right angle lever $n$ fulcrum at $n^2$ in base B.

The triangle V, carrier of the conjunct which forms the ratchet wheel or free pinion described, opens by means of hinges 1 which are imbedded in the bottom of the container Q and in its upper part secured by a pin 2, which may adopt any form or system of closure without this representing a departure from the spirit of the invention, in the same manner as with the lateral pins 3, which secure and hold the lug 4 (Figs. 1, 2, and 3). In the bottom of the container Q two stems 5 (Fig. 4), have been placed, which imbed in the perforations ad-hoc 6 in the base B (Fig. 3). All this secures and holds in an effective manner the container Q on the base B, forming a perfect conjunct, easily dismountable.

Working

The working is very simple, and is of exact and positive results. The base A is placed on a meat slicing machine of a suitable type for the object in view, and secured by means of screws, bolts, etc.; it is aligned in such manner that the advance of the container Q coincides with the bread, to which it will be opposite.

The lever 11 of the meat slicing machine travels over a straight line 10, and in its travel encounters the lever L (Fig. 3). This lever L, of adequate form, with a more or less concave contact surface, having its fulcrum at M, drags the central shaft J (Fig. 3), in an outward direction, and the latter has the same effect on the handle K, which is clutched with the rack I at the point which is shown in Fig. 3, and therefore dragging the bushings F which are in turn the carriers of the base B, on which is disposed the butter container Q. But in dragging the base B, the right-angle lever N is also displaced in a forward direction, as will be seen in the dotted lines in Fig. 3, and as one of the forks grasps the pillar O fixed in the base A, the other work will move the appendix of the ratchet or pinion Z, said ratchet effecting in the screw T (Fig. 1) an advance movement, which causes a portion of butter to pass through the pores or netting of the front R at the same moment that the bread is found opposite to it, inasmuch as the carriage of the slicing machine has brought it towards that point.

At the same time the container Q has advanced, inasmuch as it forms a solidary body with the base B, said advance being shown in dotted lines in Fig. 1.

Fig. 3 shows the lever 11 of the carriage in its alternating travel in straight line 10.

The bread placed in the customary position in the ordinary slicing machines with circular and vertical knife, is buttered before reaching said knife, and the bread on being cut is collected already buttered, owing to the contact that it has suffered with the front R.

The travel of the lever 11 of the slicing machine is calculated so that it shall not escape from the curvature of the lever L, and no sooner the latter finishes its pressure at the point mentioned and on retiring, the whole of the mechanism returns to position, forced by the springs G which effect pressure on the bushings F and reject them towards the columns D.

When it is desired for any reason, that the buttering device should not act, but to use only the ordinary slicing machine, in the teeth $I^1$ (Fig. 6) is clutched the handle K in the part $I^2$ which is seen in Fig. 3, forcing the central shaft to advance and the lever L to be placed as shown in the dotted lines of said figure, the lever L not being affected in any way by the passing of the lever 11 of the cutting machine.

The rack I carries for the better fulfilment of its function, an elastic base $I^3$ (Fig. 6), which avoids any accidental unclutching.

The size, as also the proportions of the various parts described and their constructional details, will be those best adapted to the different functions to be performed, without such representing a departure from the sphere of the invention, the principles of which have been described and designed.

The material employed in the construction of the machine according to the present invention, will preferably be of metal, although other materials may be used in one or various parts if found convenient.

Having thus described my invention, what I claim as new and desire to secure by Letters Patent is:

In a machine for buttering sandwiches, a slicer for the bread, a butter container having a perforated end wall, a right-angle lever having forked ends, a pin engaging between the prongs of the fork at one end of said lever, a shaft operated by the lever of the slicer engaging said right-angle lever, a lever having convex concave edges fulcrumed in its center pivoted to said shaft, a butter container, a plunger normally arranged therein, a rod for said plunger, a disc on said rod, and a finger on said disc for engaging between the prongs of the fork on the other end of said right-angle lever to advance said plunger to press the butter in said container through the screened wall thereof against a sandwich sliced by said slicer, and means for automatically returning the parts into their normal position after each operation.

In testimony whereof, I affix my signature.

P. CLERIGO PEREZ.